US009612672B2

(12) United States Patent
Yao et al.

(10) Patent No.: US 9,612,672 B2
(45) Date of Patent: Apr. 4, 2017

(54) SLIDE UNLOCKING METHOD FOR TOUCHSCREEN DEVICE UNDER SCREEN LOCKING STATE

(71) Applicant: HUIZHOU TCL MOBILE COMMUNICATION CO., LTD., Huizhou, Guangdong (CN)

(72) Inventors: Chan Yao, Huizhou (CN); Meili Wang, Huizhou (CN); Zhoujun Yu, Huizhou (CN)

(73) Assignee: HUIZHOU TCL MOBILE COMMUICATION CO., LTD., HuiZhou, Guangdong (CN)

( * ) Notice: Subject to any disclaimer, the term of this patent is extended or adjusted under 35 U.S.C. 154(b) by 333 days.

(21) Appl. No.: 14/382,242

(22) PCT Filed: Mar. 13, 2013

(86) PCT No.: PCT/CN2013/072512
§ 371 (c)(1),
(2) Date: Aug. 29, 2014

(87) PCT Pub. No.: WO2013/181956
PCT Pub. Date: Dec. 12, 2013

(65) Prior Publication Data
US 2015/0029121 A1    Jan. 29, 2015

(30) Foreign Application Priority Data

Jun. 6, 2012  (CN) .......................... 2012 1 0185949

(51) Int. Cl.
G06F 3/041       (2006.01)
H04M 1/67       (2006.01)
(Continued)

(52) U.S. Cl.
CPC ............ *G06F 3/041* (2013.01); *G06F 3/0488* (2013.01); *G06F 3/04847* (2013.01);
(Continued)

(58) Field of Classification Search
CPC .... G06F 3/041; G06F 3/04847; G06F 3/0488; G06F 3/04883; G06F 2203/04101; H04M 1/67; H04M 2250/22
(Continued)

(56) References Cited

U.S. PATENT DOCUMENTS

2007/0150842 A1* 6/2007 Chaudhri ............ G06F 3/04883
                                                              715/863
2009/0264159 A1   10/2009 Hsieh et al.
2011/0157057 A1*  6/2011 Hata .................... G06F 1/1681
                                                              345/173

FOREIGN PATENT DOCUMENTS

CN    101866259    10/2010
CN    101907968    12/2010
(Continued)

OTHER PUBLICATIONS

International Search Report mailed Jun. 20, 2013; PCT/CN2013/072512.

*Primary Examiner* — Amare Mengistu
*Assistant Examiner* — Stacy Khoo
(74) *Attorney, Agent, or Firm* — Ladas & Parry LLP

(57) ABSTRACT

A slide unlocking method for a touchscreen device under a screen locking state is provided. The method includes steps of: sampling a track generated by the sliding of a user's finger on a touchscreen, and sequentially acquiring a plurality of sampling points; acquiring a first sampling point and a last sampling point of the track, and calculating a transverse sliding distance and a longitudinal sliding distance of the finger on the touchscreen; and unlocking the touchscreen when the transverse sliding distance is greater (Continued)

than or equal to a first preset distance and the longitudinal sliding distance is less than or equal to a second preset distance; otherwise, keeping the screen in the lock state. In this way, the present invention increases the degrees of freedom of a user's operation, so that a user can conveniently perform unlocking in a special usage scenario.

15 Claims, 6 Drawing Sheets

(51) Int. Cl.
    *G06F 3/0488*     (2013.01)
    *G06F 3/0484*     (2013.01)

(52) U.S. Cl.
    CPC .......... *G06F 3/04883* (2013.01); *H04M 1/67* (2013.01); *G06F 2203/04101* (2013.01); *H04M 2250/22* (2013.01)

(58) Field of Classification Search
    USPC .................. 345/173–179; 178/18.01–18.09
    See application file for complete search history.

(56) References Cited

FOREIGN PATENT DOCUMENTS

| | | |
|---|---|---|
| CN | 101943993 | 1/2011 |
| CN | 102750090 | 10/2012 |
| WO | 2012028773 | 3/2012 |

* cited by examiner

SLIDE UNLOCKING METHOD FOR TOUCHSCREEN DEVICE UNDER SCREEN LOCKING STATE

CROSS REFERENCE TO RELATED APPLICATION

This application claims the priority of International Application No. PCT/CN2013/072512, filed on Mar. 13, 2013, which claims priority to Chinese Application No. 201210185949.4, filed on Jun. 6, 2012. The entire disclosures of each of the above applications are incorporated herein by reference.

TECHNICAL FIELD OF THE INVENTION

The present invention relates to a touchscreen technology, and more particularly, to a slide unlocking method for a touchscreen device under a screen locking state.

BACKGROUND OF THE INVENTION

In an unlocking method for conventional touchscreen devices, an unlocking picture is displayed at a preset position on a touchscreen under a screen locking state, and a user carries out the unlocking by moving the unlocking picture from the preset position into a predetermined unlocking region. The conventional unlocking method needs the user to make an accurate positioning and to unlock the screen according to a specific path. This increases the difficulty in perform unlocking in a special usage scenario.

Therefore, there is a need to provide a slide unlocking method for a touchscreen device under a screen locking state for solving the above problems.

SUMMARY OF THE INVENTION

The main technical problem to be solved in the present invention is to provide a slide unlocking method for a touchscreen device under a screen locking state, which is capable of unlocking a touchscreen in any region of the touchscreen.

To solve the above technical problems, one technical scheme adopted in the present invention is to provide a slide unlocking method for a touchscreen device under a screen locking state, which comprises steps of:

sampling a track generated by the sliding of a user's finger on a touchscreen, and sequentially acquiring a plurality of sampling points, each sampling point having an x-axis coordinate value and a y-axis coordinate value;

acquiring a first sampling point and a last sampling point of the track, calculating a transverse sliding distance of the finger on the touchscreen by subtracting the x-axis coordinate value of the last sampling point and the x-axis coordinate value of the first sampling point from one another and calculating its absolute value, and calculating a longitudinal sliding distance of the finger on the touchscreen by subtracting the y-axis coordinate value of the last sampling point and the y-axis coordinate value of the first sampling point one from one another and calculating its absolute value;

unlocking the touchscreen when the transverse sliding distance is greater than or equal to a first preset distance D1 and the longitudinal sliding distance is less than or equal to a second preset distance D2; otherwise, keeping the touchscreen in the screen locking state; and unlocking the touchscreen when the longitudinal sliding distance is greater than or equal to a third preset distance D3 and the transverse sliding distance is less than or equal to a fourth preset distance D4; otherwise, keeping the touchscreen in the screen locking state.

To solve the above technical problems, another technical scheme adopted in the present invention is to provide a slide unlocking method for a touchscreen device under a screen locking state, which comprises steps of:

sampling a track generated by the sliding of a user's finger on a touchscreen, and sequentially acquiring a plurality of sampling points, each sampling point having an x-axis coordinate value and a y-axis coordinate value;

acquiring a first sampling point and a last sampling point of the track, calculating a transverse sliding distance of the finger on the touchscreen by subtracting the x-axis coordinate value of the last sampling point and the x-axis coordinate value of the first sampling point from one another and calculating its absolute value, and calculating a longitudinal sliding distance of the finger on the touchscreen by subtracting the y-axis coordinate value of the last sampling point and the y-axis coordinate value of the first sampling point one from one another and calculating its absolute value; and unlocking the touchscreen when the transverse sliding distance is greater than or equal to a first preset distance D1 and the longitudinal sliding distance is less than or equal to a second preset distance D2, and keeping the touchscreen in the screen locking state and showing a prompt for unlocking the touchscreen when the transverse sliding distance is less than the first preset distance D1 or the longitudinal sliding distance is greater than the second preset distance D2.

To solve the above technical problems, still another technical scheme adopted in the present invention is to provide a slide unlocking method for a touchscreen device under a screen locking state, which comprises steps of:

sampling a track generated by the sliding of a user's finger on a touchscreen, and sequentially acquiring a plurality of sampling points, each sampling point having an x-axis coordinate value and a y-axis coordinate value;

acquiring a first sampling point and a last sampling point of the track, calculating a transverse sliding distance of the finger on the touchscreen by subtracting the x-axis coordinate value of the last sampling point and the x-axis coordinate value of the first sampling point from one another and calculating its absolute value, and calculating a longitudinal sliding distance of the finger on the touchscreen by subtracting the y-axis coordinate value of the last sampling point and the y-axis coordinate value of the first sampling point from one another and calculating its absolute value; and unlocking the touchscreen when the longitudinal sliding distance is greater than or equal to a third preset distance D3 and the transverse sliding distance is less than or equal to a fourth preset distance D4, and keeping the touchscreen in the screen locking state and showing a prompt for unlocking the touchscreen when the longitudinal sliding distance is less than the third preset distance D3 or the transverse sliding distance is greater than the fourth preset distance D4.

The technical effects of the present invention are described below. In contrast with the conventional skills, the slide unlocking method for the touchscreen device under the screen locking state disclosed in the present invention carries out the touchscreen unlocking by acquiring a plurality of sampling points and comparing preset distances with the transverse sliding distance or longitudinal sliding distance of the user's finger on the touchscreen. In this way, the present invention increases the degrees of freedom of a user's operation, so that a user can conveniently perform unlocking in a special usage scenario. In addition, when an incorrect unlocking operation is performed by the user, a prompt for unlocking the touchscreen is shown so as to improve the user's experience.

DETAILED DESCRIPTION OF THE INVENTION

Figure 1:
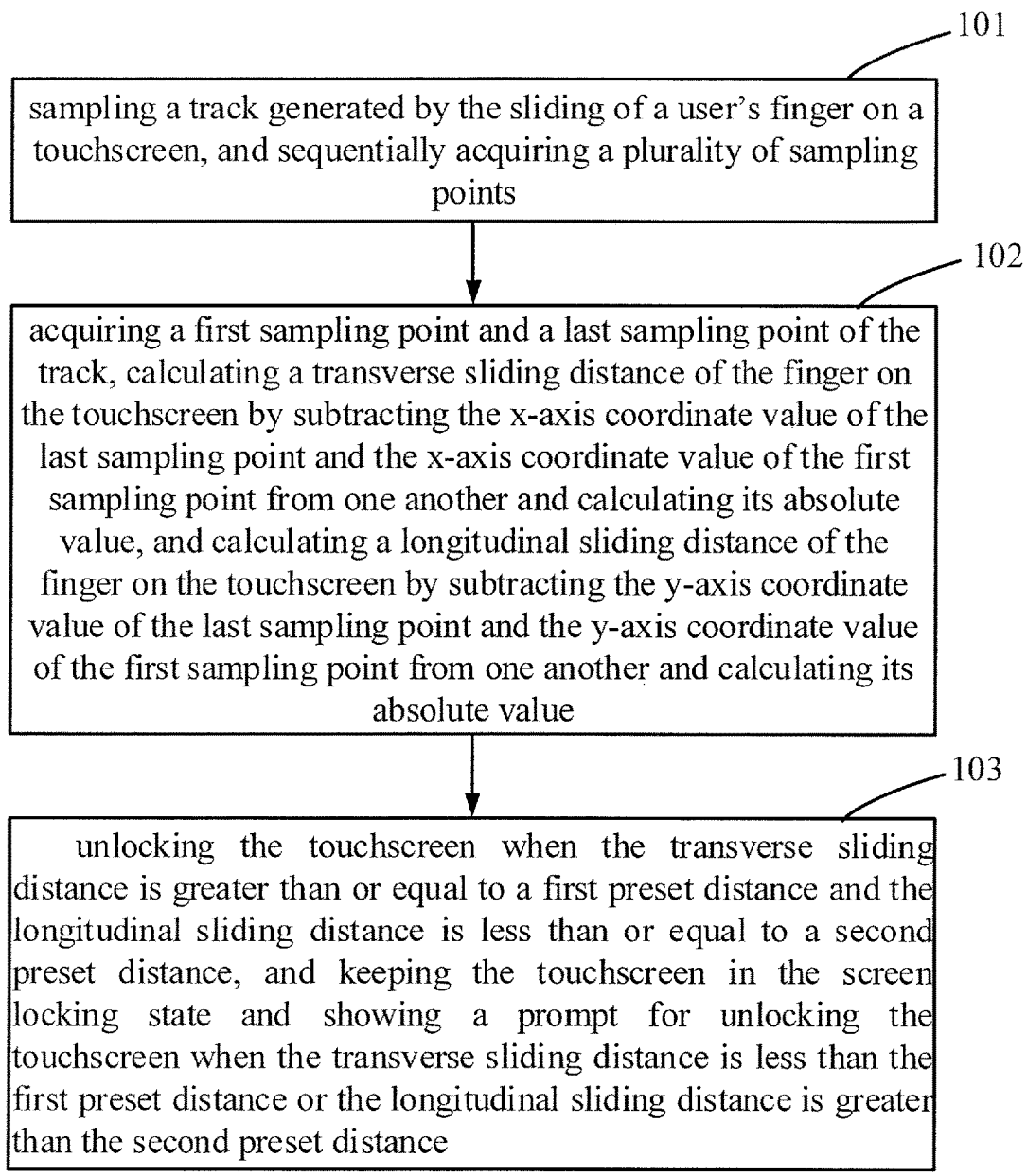
FIG. 1 is a flow chart of a slide unlocking method for a touchscreen device under a screen locking state in accordance with a first preferred embodiment of the present invention.

Please refer to FIG. 1, which is a flow chart of a slide unlocking method for a touchscreen device under a screen locking state in accordance with a first preferred embodiment of the present invention. As shown in FIG. 1, the slide unlocking method for the touchscreen device under the screen locking state disclosed in the present embodiment comprises the following steps.

In Step 101, a track generated by the sliding of a user's finger on a touchscreen is sampled, and a plurality of sampling points are sequentially acquired.

In Step 102, a first sampling point and a last sampling point of the track are acquired, a transverse sliding distance of the finger on the touchscreen is calculated by subtracting the x-axis coordinate value of the last sampling point and the x-axis coordinate value of the first sampling point from one another and calculating its absolute value, and a longitudinal sliding distance of the finger on the touchscreen is calculated by subtracting the y-axis coordinate value of the last sampling point and the y-axis coordinate value of the first sampling point from one another and calculating its absolute value.

In Step S103, the touchscreen is unlocked when the transverse sliding distance is greater than or equal to a first preset distance D1 and the longitudinal sliding distance is less than or equal to a second preset distance D2, and the touchscreen is kept in the screen locking state and a prompt for unlocking the touchscreen is shown when the transverse sliding distance is less than the first preset distance D1 or the longitudinal sliding distance is greater than the second preset distance D2.

In Step 102, the touchscreen has a preset region disposed thereon and the first sampling point is located at the preset region.

In Step 103, the first preset distance D1 and the second preset distance D2 have a relationship represented by $$D2 = D1 * L/H, \quad (1)$$

where H is the transverse length of the touchscreen and L is the longitudinal length of the touchscreen.

In the present embodiment, the first preset distance D1 is preferably half of the transverse length H of the touchscreen.

Based on Equation (1), it can be known that the second preset distance D2 is half of the longitudinal length L of the touchscreen. In other embodiments, a person skilled in the art can set the first preset distance D1 to other values.

The slide unlocking method for the touchscreen device under the screen locking state is further described below in combination with the touchscreen device.

Figure 2:
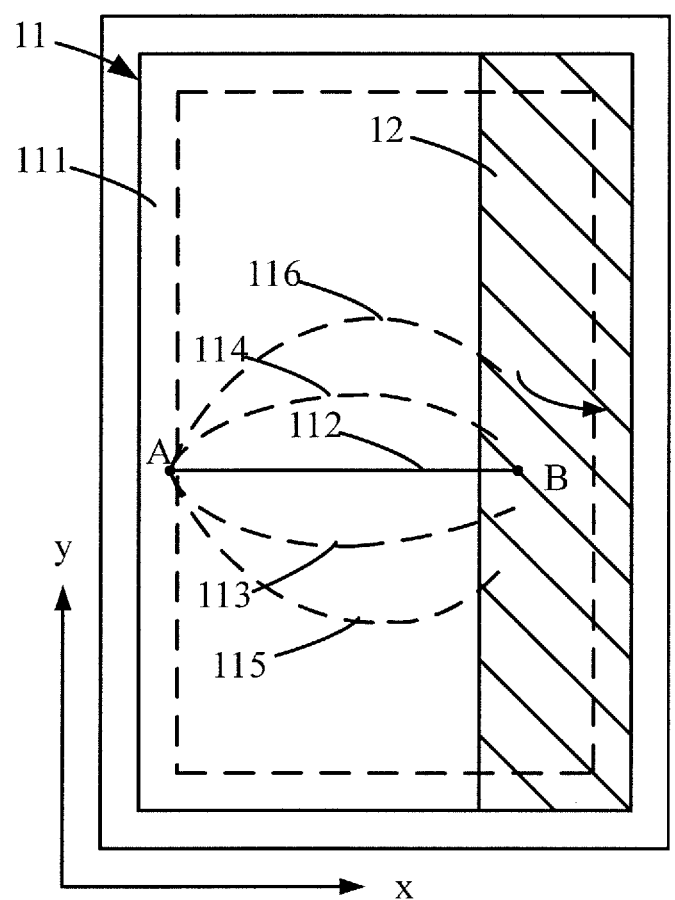
FIG. 2 is a schematic diagram showing a touchscreen device being unlocked normally in FIG. 1.

As shown in FIG. 2, which is a schematic diagram showing a touchscreen device being unlocked normally in FIG. 1, the touchscreen device 10 disclosed in the present embodiment comprises a touchscreen 11, and the touchscreen 11 has a preset region 111 disposed thereon. In the present embodiment, there is an x-y coordinate system on a plane where the touchscreen 11 is located.

In Step 101, each sampling point has an x-axis coordinate value and a y-axis coordinate value. The x axis is parallel to the direction of the transverse length H of the touchscreen. The y axis is parallel to the direction of the longitudinal length L of the touchscreen.

In Step 102, a first sampling point A and a last sampling point B are acquired. The first sampling point A is within the preset region 111. The coordinate of the first sampling point A is (x1, y1) and the coordinate of the last sampling point B is (x2, y2). The touchscreen device 10 calculates a transverse sliding distance L1 of the user's finger on the touchscreen 11 by subtracting the x coordinate value x2 of the last sampling point B and the x coordinate value x1 of the first sampling point A from one another and calculating its absolute value, i.e., $L1 = |x2 - x1|$, and calculates a longitudinal sliding distance L2 of the user's finger on the touchscreen 11 by subtracting the y coordinate value y2 of the last sampling point B and the y coordinate value y1 of the first sampling point A from one another and calculating its absolute value, i.e., $L2 = |y2 - y1|$.

In Step 103, the touchscreen device 10 compares the transverse sliding distance L1 with a first preset distance D1 and compares the longitudinal sliding distance L2 with a second preset distance D2. When the transverse sliding distance L1 is greater than or equal to the first preset distance D1 and the longitudinal sliding distance L2 is less than or equal to the second preset distance D2, the touchscreen 11 is unlocked. Accordingly, all the sliding tracks 112, 113, 114, 115, and 116 on the touchscreen 11 can carry out the touchscreen unlocking. In addition, when unlocking the touchscreen 11, an unlocking animation 12 is further displayed on the touchscreen 11. A background program executed in the locked touchscreen presents the unlocking animation 12, which brings a 3D page flipping effect based on the sliding direction of the user's finger on the touchscreen 11, until the unlocking is accomplished. In such a manner, the touchscreen 11 enters a screen unlocking state. In other embodiments, a person skilled in the art can replace the unlocking animation 12 with other animations.

Figure 3:
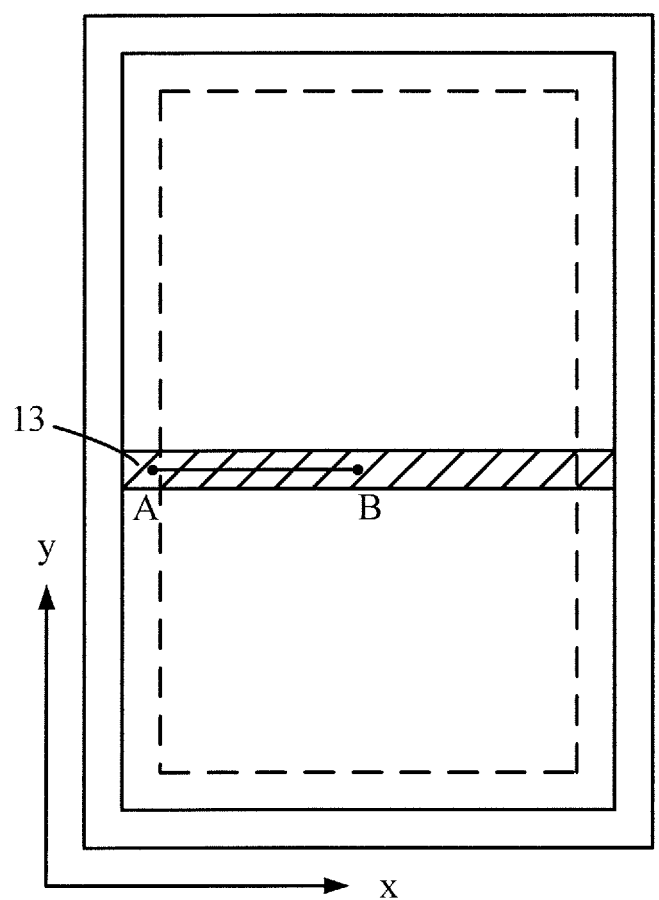
FIG. 3 is a schematic diagram showing a touchscreen device being unlocked abnormally in FIG. 1.

As shown in FIG. 3, when the transverse sliding distance L1 is less than the first preset distance D1 or the longitudinal sliding distance L2 is greater than the second preset distance D2, the touchscreen 11 is kept in the screen locking state and a prompt 13 for unlocking the touchscreen 11 is shown. The prompt 13 is shown when the user's finger touches the touchscreen 11 at the position of the prompt 13, so as to prompt the user with a correct way to unlock the touchscreen 11. The prompt 13 for unlocking the touchscreen 11 may include a text, a picture, or an animation.

It's important to note that in other embodiments, the position of the first sampling point A and the position of the last sampling point B are interchangeable.

In contrast with conventional touchscreen devices, the slide unlocking method for the touchscreen device 10 under the screen locking state disclosed in the present embodiment carries out the touchscreen unlocking by sliding the user's finger across the touchscreen 11 for a transverse distance L1 greater than or equal to the first preset distance D1 and a longitudinal distance L2 less than or equal to the second preset distance D2. In this way, the present invention increases the degrees of freedom of a user's operation, so that a user can conveniently perform unlocking in a special usage scenario (for example, one-handed, while driving, or in an emergency). In addition, when an incorrect unlocking operation is performed by the user, the prompt 13 for unlocking the touchscreen 11 is shown so as to improve the user's experience.

Figure 4:
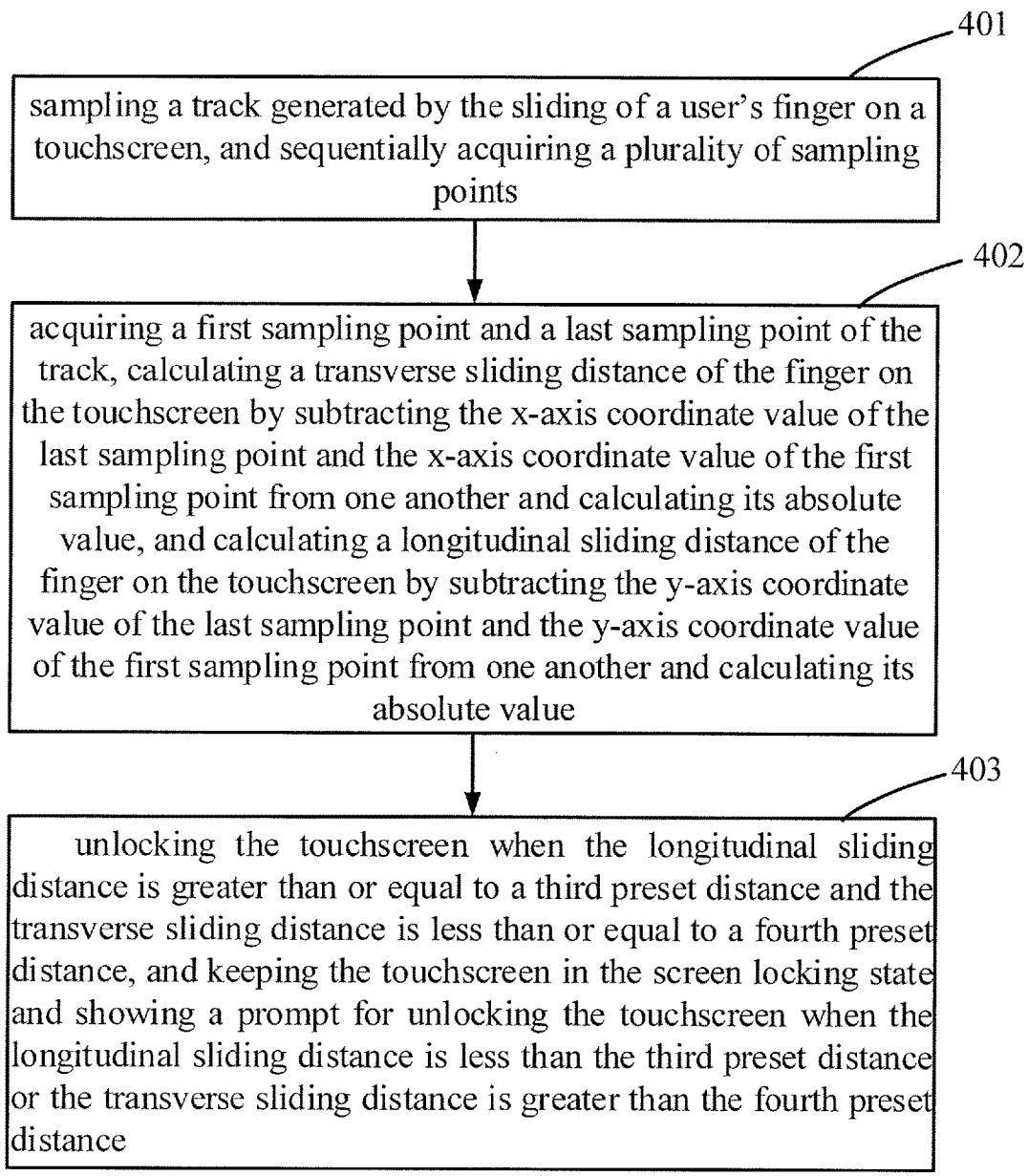
FIG. 4 is a flow chart of a slide unlocking method for a touchscreen device under a screen locking state in accordance with a second preferred embodiment of the present invention.

Please refer to FIG. 4, which is a flow chart of a slide unlocking method for a touchscreen device under a screen locking state in accordance with a second preferred embodiment of the present invention. As shown in FIG. 4, the slide unlocking method for the touchscreen device under the screen locking state disclosed in the present embodiment comprises the following steps.

In accordance with the aforesaid Steps 101-102 shown in FIG. 1, a plurality of sampling points are sequentially acquired, and the transverse sliding distance and the longitudinal sliding distance obtained from the last sampling point and the first sampling point on the touchscreen are calculated.

In Step 403, the touchscreen is unlocked when the longitudinal sliding distance is greater than or equal to a third preset distance D3 and the transverse sliding distance is less than or equal to a fourth preset distance D4, and the touchscreen is kept in the screen locking state and a prompt for unlocking the touchscreen is shown when the longitudinal sliding distance is less than the third preset distance D3 or the transverse sliding distance is greater than the fourth preset distance D4.

In Step 402, the touchscreen has a preset region disposed thereon and the first sampling point is located at the preset region.

In Step 403, the third preset distance D3 and the fourth preset distance D4 have a relationship represented by $$D4=D3*H/L, \qquad (2)$$

where H is the transverse length of the touchscreen and L is the longitudinal length of the touchscreen.

In the present embodiment, the third preset distance D3 is preferably half of the longitudinal length L of the touchscreen. Based on Equation (2), it can be known that the fourth preset distance D4 is half of the transverse length H of the touchscreen. In other embodiments, a person skilled in the art can set the third preset distance D3 to other values.

The slide unlocking method for the touchscreen device under the screen locking state is further described below in combination with the touchscreen device.

Figure 5:
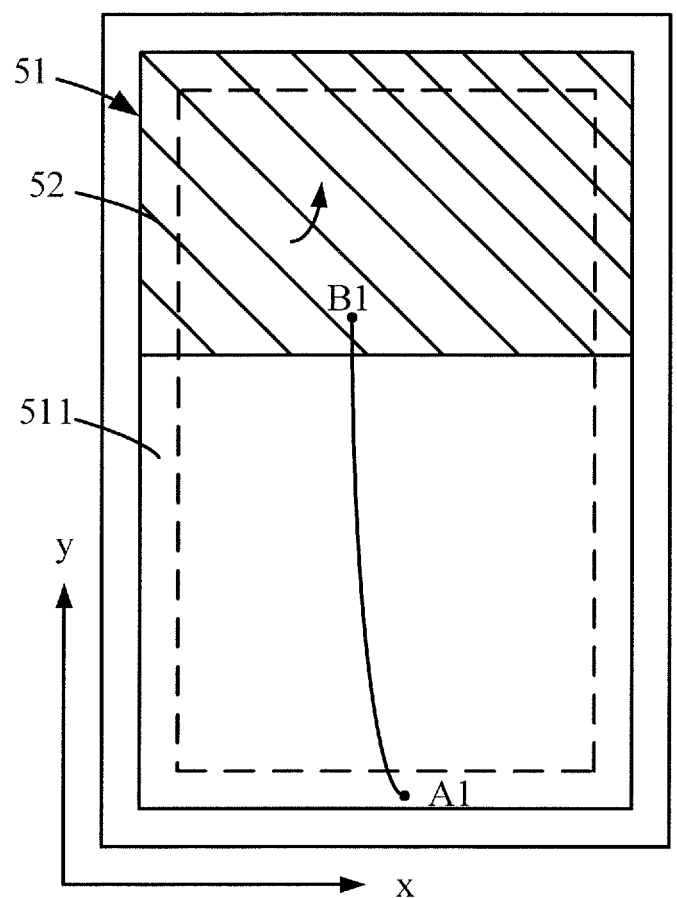
FIG. 5 is a schematic diagram showing a touchscreen device being unlocked normally in FIG. 4.

As shown in FIG. 5, which is a schematic diagram showing a touchscreen device being unlocked normally in FIG. 4, the touchscreen device 50 disclosed in the present embodiment comprises a touchscreen 51, and the touchscreen 51 has a preset region 511 disposed thereon. In the present embodiment, there is an x-y coordinate system on a plane where the touchscreen 51 is located.

In Step 401, each sampling point has an x-axis coordinate value and a y-axis coordinate value. The x axis is parallel to the direction of the transverse length H of the touchscreen. The y axis is parallel to the direction of the longitudinal length L of the touchscreen.

In Step 402, a first sampling point A1 and a last sampling point B1 are acquired. The first sampling point A1 is within the preset region 511. The coordinate of the first sampling point A1 is (x3, y3) and the coordinate of the last sampling point B1 is (x4, y4). The touchscreen device 50 calculates a transverse sliding distance L3 of the user's finger on the touchscreen 51 by subtracting the x coordinate value x4 of the last sampling point B1 and the x coordinate value x3 of the first sampling point A1 from one another and calculating its absolute value, i.e., L3 =|x4−x3|, and calculates a longitudinal sliding distance L4 of the user's finger on the touchscreen 51 by subtracting the y coordinate value y4 of the last sampling point B1 and the y coordinate value y3 of the first sampling point A1 from one another and calculating its absolute value, i.e., L4 =|y4−y3|.

In Step 403, the touchscreen device 50 compares the longitudinal sliding distance L4 with a third preset distance D3 and compares the transverse sliding distance L3 with a fourth preset distance D4. When the longitudinal sliding distance L4 is greater than or equal to the third preset distance D3 and the transverse sliding distance L3 is less than or equal to a fourth preset distance D4, the touchscreen 51 is unlocked. In addition, when unlocking the touchscreen 51, an unlocking animation 52 is further displayed on the touchscreen 51. A background program executed in the locked touchscreen presents the unlocking animation 52, which brings a 3D page flipping effect based on the sliding direction of the user's finger on the touchscreen 51, until the unlocking is accomplished. In such a manner, the touchscreen 51 enters a screen unlocking state. In other embodiments, a person skilled in the art can replace the unlocking animation 52 with other animations.

Figure 6:
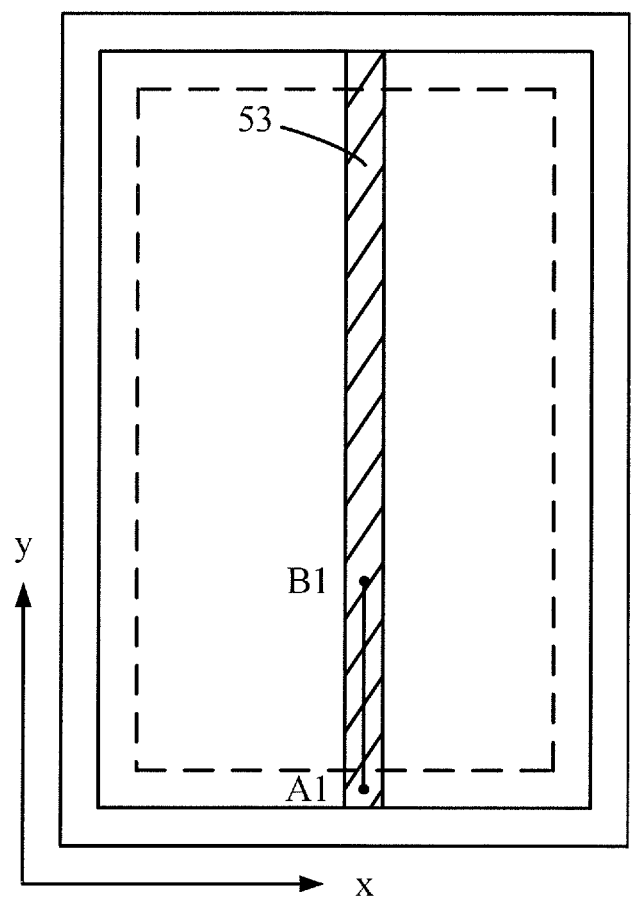
FIG. 6 is a schematic diagram showing a touchscreen device being unlocked abnormally in FIG. 4.

As shown in FIG. 6, when the longitudinal sliding distance L4 is less than the third preset distance D3 or the transverse sliding distance L3 is greater than the fourth preset distance D4, the touchscreen 51 is kept in the screen locking state and a prompt 53 for unlocking the touchscreen 51 is shown. The prompt 53 is shown when the user's finger touches the touchscreen 51 at the position of the prompt 53, so as to prompt the user with a correct way to unlock the touchscreen 51. The prompt 53 for unlocking the touchscreen 51 may include a text, a picture, or an animation.

It's important to note that in other embodiments, the position of the first sampling point A1 and the position of the last sampling point B1 are interchangeable.

In contrast with conventional touchscreen devices, the slide unlocking method for the touchscreen device 50 under the screen locking state disclosed in the present embodiment carries out the touchscreen unlocking by sliding the user's finger across the touchscreen 51 for a longitudinal distance L4 greater than or equal to the third preset distance D3 and a transverse distance L3 less than or equal to the fourth preset distance D4. In this way, the present invention increases the degrees of freedom of a user's operation, so that a user can conveniently perform unlocking in a special usage scenario (for example, one-handed, while driving, or in an emergency). In addition, when an incorrect unlocking operation is performed by the user, the prompt 53 for unlocking the touchscreen 51 is shown so as to improve the user's experience.

Above all, compared to the conventional touchscreen devices, the slide unlocking method for the touchscreen device under the screen locking state disclosed in the present invention carries out the touchscreen unlocking by acquiring a plurality of sampling points and comparing preset distances with the transverse sliding distance or longitudinal sliding distance of the user's finger on the touchscreen. In this way, the present invention increases the degrees of freedom of a user's operation, so that a user can conveniently perform unlocking in a special usage scenario. In addition, when an incorrect unlocking operation is performed by the user, a prompt for unlocking the touchscreen is shown so as to improve the user's experience.

The above descriptions are specific embodiments of the present invention, but the scope of the present invention must not be limited thereto. All equivalent structural alterations or equivalent process alterations made according to the specification and the appended drawings of the present invention, or its applications directly or indirectly used in other related technical fields, are within the protective scope of the present invention.

What is claimed is:

1. A slide unlocking method for a touchscreen device under a screen locking state, comprising steps of:

sampling a track generated by the sliding of a user's finger on a touchscreen, and sequentially acquiring a plurality of sampling points, each sampling point having an x-axis coordinate value and a y-axis coordinate value;

acquiring a first sampling point and a last sampling point of the track, calculating a transverse sliding distance of the finger on the touchscreen by subtracting the x-axis coordinate value of the last sampling point and the x-axis coordinate value of the first sampling point from one another and calculating its absolute value, and calculating a longitudinal sliding distance of the finger on the touchscreen by subtracting the y-axis coordinate value of the last sampling point and the y-axis coordinate value of the first sampling point from one another and calculating its absolute value: and unlocking the touchscreen when the transverse sliding distance is greater than or equal to a first preset distance and the longitudinal sliding distance is less than or equal to a second preset distance, and keeping the touchscreen in the screen locking state and showing a prompt for unlocking the touchscreen when the transverse sliding distance is less than the first preset distance or the longitudinal sliding distance is greater than the second preset distance;

wherein the first preset distance and the second preset distance have a relationship represented by $$D2=D1*L/H,$$

where D1 represents the first preset distance, D2 repesents the second distance, H is a transverse length of the touchscreen, and L is a longitudinal length of the touchscreen.

2. The method according to claim 1, wherein the touchscreen has a preset region disposed thereon and the first sampling point is located at the preset region.

3. The method according to claim 1, wherein the first preset distance is half of the transverse length of the touchscreen and the second preset distance is half of the longitudinal length of the touchscreen.

4. The method according to claim 1, wherein an unlocking animation is displayed on the touchscreen when unlocking the touchscreen.

5. A slide unlocking method for a touchscreen device under a screen locking state, comprising steps of:

sampling a track generated by the sliding of a user's finger on a touchscreen, and sequentially acquiring a plurality of sampling points, each sampling point having an x-axis coordinate value and a y-axis coordinate value;

acquiring a first sampling point and a last sampling point of the track, calculating a transverse sliding distance of the finger on the touchscreen by subtracting the x-axis coordinate value of the last sampling point and the x-axis coordinate value of the first sampling point from one another and calculating its absolute value, and calculating a longitudinal sliding distance of the finger on the touchscreen by subtracting the y-axis coordinate value of the last sampling point and the y-axis coordinate value of the first sampling point from one another and calculating its absolute value; and unlocking the touchscreen when the longitudinal sliding distance is greater than or equal to a first preset distance and the transverse sliding distance is less than or equal to a second preset distance, and keeping the touchscreen in the screen locking state and showing a prompt for unlocking the touchscreen when the longitudinal sliding distance is less than the first preset distance or the transverse sliding distance is greater than the second preset distance;

wherein the first preset distance and the second preset distance have a relationship represented by $$D2=D1*H/L,$$

where D1 represents the first preset distance, D2 represents the second preset distance, H is a transverse length of the touchscreen, and L is a longitudinal length of the touchscreen.

6. The method according to claim 5, wherein the touchscreen has a preset region disposed thereon and the first sampling point is located at the preset region.

7. The method according to claim 5, wherein the first preset distance is half of the longitudinal length of the touchscreen and the second preset distance is half of the transverse length of the touchscreen.

8. The method according to claim 5, wherein an unlocking animation is displayed on the touchscreen when unlocking the touchscreen.

9. A slide unlocking method for a touchscreen device under a screen locking state, comprising steps of:

sampling a track generated by sliding of a user's finger on a touchscreen and sequentially acquiring a plurality of sampling points;

calculating a transverse sliding distance of the finger on the touchscreen by using the sampling points;

calculating a longitudinal sliding distance of the finger on the touchscreen by using the sampling points; and unlocking the touchscreen when the transverse sliding distance is greater than or equal to a first preset distance and the longitudinal sliding distance is less than or equal to a second preset distance, and keeping the touchscreen in the screen locking state and showing a prompt for unlocking the touchscreen when the transverse sliding distance is less than the first preset distance or the longitudinal sliding distance is greater than the second preset distance;

wherein the first preset distance and the second preset distance have a relationship represented by $$D2=D1*L/H,$$

where D1 represents the first preset distance, D2 represents the second preset distance, H is a transverse length of the touchscreen, and L is a longitudinal length of the touchscreen.

10. The method according to claim 9, wherein the transverse sliding distance is calculated by subtracting an x-axis coordinate value of a last sampling point of the track and an x-axis coordinate value of a first sampling point of the track from one another and calculating its absolute value.

11. The method according to claim 9, wherein the longitudinal sliding distance is calculated by subtracting a y-axis coordinate value of a last sampling point of the track and a y-axis coordinate value of a first sampling point of the track from one another and calculating its absolute value.

12. The method according to claim 9, wherein the first preset distance is half of the transverse length of the touchscreen and the second preset distance is half of the longitudinal length of the touchscreen.

13. The method according to claim 9, further comprising a step of:
unlocking the touchscreen when the longitudinal sliding distance is greater than or equal to a third preset distance and the transverse sliding distance is less than or equal to a fourth preset distance, and keeping the touchscreen in the screen locking state and showing a prompt for unlocking the touchscreen when the longitudinal sliding distance is less than the third preset distance or the transverse sliding distance is greater than the fourth preset distance.

14. The method according to claim 13, wherein the third preset distance and the fourth preset distance have a relationship represented by $$D4=D3*H/L,$$

where D3 represents the third preset distance, D4 represents fourth preset distance, H is a transverse length of the touchscreen, and L is a longitudinal length of the touchscreen.

15. The method according to claim 14, wherein the third preset distance is half of the longitudinal length of the touchscreen and the fourth preset distance is half of the transverse length of the touchscreen.

* * * * *